J. T. WILKIN.
EXTRACTOR OF LIQUIDS AND SOLIDS FROM GASES.
APPLICATION FILED MAY 27, 1914.
1,105,868.
Patented Aug. 4, 1914.
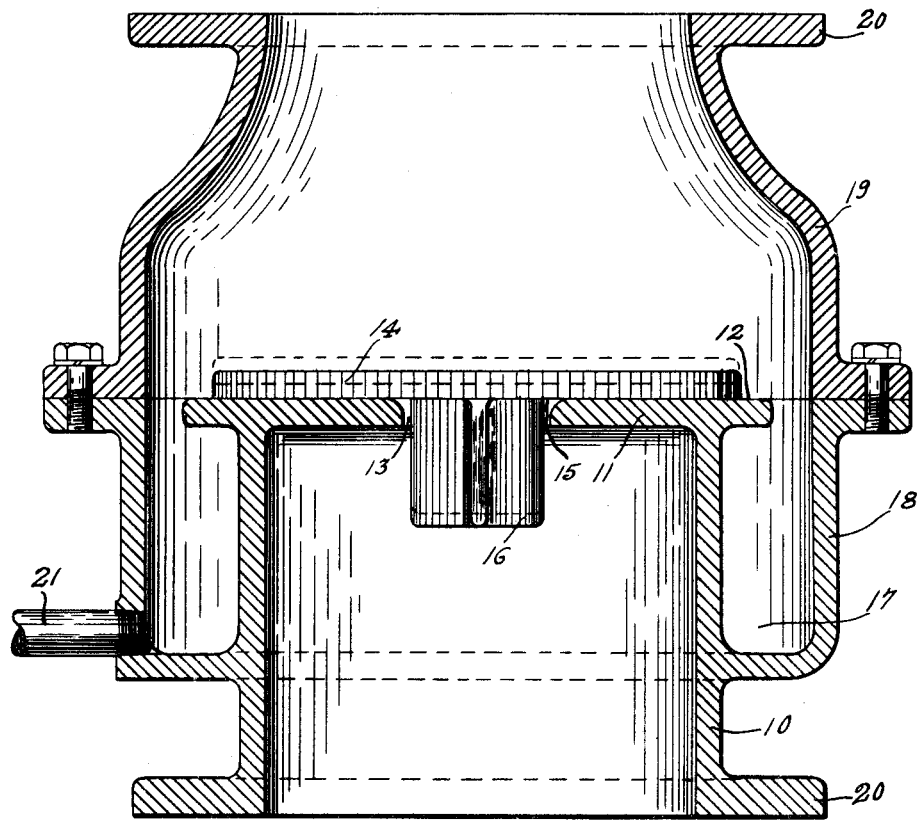
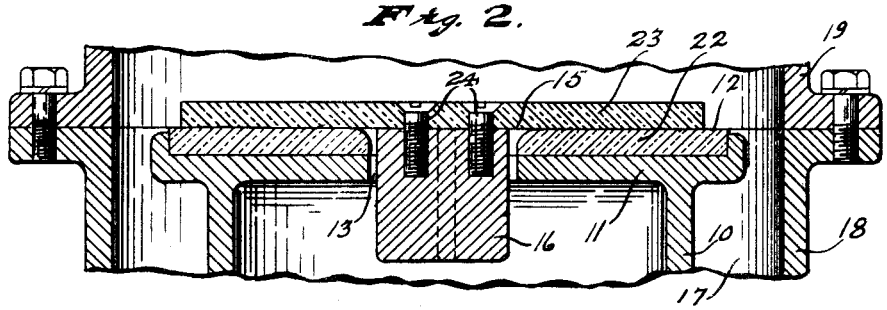
WITNESSES:
Yost Braddock
Josephine Gasper
INVENTOR
JOHN T. WILKIN
BY
Hood & Schley
ATTORNEYS

UNITED STATES PATENT OFFICE.

JOHN T. WILKIN, OF CONNERSVILLE, INDIANA, ASSIGNOR TO THE CONNERSVILLE BLOWER COMPANY, OF CONNERSVILLE, INDIANA, A CORPORATION OF INDIANA.

EXTRACTOR OF LIQUIDS AND SOLIDS FROM GASES.

1,105,868.   Specification of Letters Patent.   Patented Aug. 4, 1914.

Application filed May 27, 1914.   Serial No. 841,234.

*To all whom it may concern:*

Be it known that I, JOHN T. WILKIN, a citizen of the United States, residing at Connersville, in the county of Fayette and State of Indiana, have invented a new and useful Extractor of Liquids and Solids from Gases, of which the following is a specification.

It is the object of my invention to provide a simple means for removing suspended liquids and solids, such as tar, water, etc., from a gas. I do this by passing the gas containing the suspended liquid or solid matter through a space between two adjacent surfaces, which are preferably substantially parallel, and by causing the pressure of the gas to be diminished during the passage through such space; and also preferably by having the two surfaces relatively movable and causing them to be pressed toward each other, by reason of the aforesaid decrease in gas pressure. This causes the suspended liquid and solid particles to be collected and thrown down, and permits the gas to emerge from such space in a substantially uncontaminated condition.

The apparatus by which I have illustrated my invention comprises two relatively movable plates having adjacent, and preferably substantially parallel, surfaces, said plates being pressed toward each other in any suitable manner, and supply and discharge connections to the space between such two plates for the gas from which the suspended liquid and solid matter is to be extracted, the plates being so located relatively to each other and to the supply and discharge connections that the particles of gas diverge on passing through such space, or have radial components of motion, whereby an expansion of the gas, with the concomitant reduction in both the pressure and temperature of the gas, is produced at the outer portions of such space, such reduction in pressure causing an increase in the tendency of the two plates to be pressed together. The gas emerges from the space between the two plates in a substantially uncontaminated condition, the suspended matter having been extracted therefrom during the passage through such space.

The accompanying drawing shows this apparatus.

Figure 1 is a longitudinal section through such apparatus; and Fig. 2 is a fragmentary view showing a modified construction.

The gas containing the suspended liquid and solid matter is supplied to the lower end of the tube 10, which at its upper end terminates in a plate 11, here shown as having a horizontal upper surface 12 and a central aperture 13, such aperture being smaller than the tube 10. A plate 14, having a horizontal surface 15, rests on the surface 12, and from its lower surface a cross-shaped flange 16 projects downward through the aperture 13 to guide the movement of the plate 14. While the surfaces 12 and 15 are shown as plane surfaces, they are not necessarily so, for it is sufficient if they have a radial component from the supply aperture 13 to the point where the gas is discharged from the space between them. A pocket 17 is formed between the outside of the upper portion of the tube 10, and a surrounding tube 18, the outer edge of the plate 11 extending outward beyond the tube 10 but not so far as the inner wall of the tube 18. The tube 18 is surmounted by a discharge conduit 19, which is conveniently removably attached to the upper end of such tube, to allow ready access to the plates 11 and 14. The lower end of the tube 10 and the upper end of the discharge conduit 19 are conveniently provided with flanges 20 for furnishing a means of attachment to supply and discharge pipes. An outlet pipe 21, for the liquid and solid matter which collects in the pocket 17, communicates with the lower part of such pocket.

In operation, the gas containing the suspended liquid or solid matter to be extracted is supplied to the lower end of the tube 10, and passes through the aperture 13 into the space between the surfaces 12 and 15, lifting the plate 14 sufficiently to provide passage space between such surfaces. The particles of the gas diverge as they pass through this space, so that an expansion or rarefaction of the gas is produced, together with a cooling, and in consequence of this rarefaction of the gas as it approaches the edges of the plates 11 and 14 the latter plate is forced more strongly downward toward the former, for there is no diminution in the pressure above the plate 14. There is also undoubtedly considerable friction between the surfaces 12 and 15 and the matter passing between them. During the passage of the gas through the space between the surfaces 12 and 15, the liquid and solid particles held in suspension in such gas are collected, and extracted from the gas. such collected liquid and solid matter falling down over the outer edge of the plate 11 into the pocket 17 and being drained off as desired through the pipe 21, the uncontaminated gas passing on through the discharge conduit 19.

When tar is the substance being extracted, as in the case of the purifying of ordinary illuminating gas made from coal, there is a tendency for the extracted material to adhere to the surfaces 12 and 15. This is avoided to some extent by the downward pressure of the plate 14 on the plate 11, and the consequent contraction of the space through which the gas may pass, and is also lessened by the fact that the flow of gas through the space between the surfaces 12 and 15 carries the collected liquid and solid along with it to the outer edge of the plate 11. In order further to avoid any tendency for this tar to collect on the surfaces 12 and 15, I have found that it is desirable to make these surfaces of glass, as this not only largely or wholly avoids the tendency for the tar to stick but also lessens the chemical action. This arrangement is shown in Fig. 2, where a glass plate 22 is mounted on the upper side of the plate 12, in any convenient manner, and a glass plate 23 takes the place of the plate 14 of Fig. 1, this glass plate 23 being provided with the same depending cross shaped flange 16 as was the plate 14, such flange being either integral as in Fig. 1 or attached by screws 24.

I claim as my invention:

1. An extractor for extracting suspended solids or liquid from gas, comprising two members having adjacent surfaces substantially parallel with each other, said members being relatively movable and pressed toward each other, one of said members being provided with an aperture from which each of the surfaces has a radial component and through which the gas to be purified may be supplied to the space between such surfaces, a pocket into which the outer edge of the space between such two surfaces discharges, and a discharge conduit leading from the outer edge of such space.

2. An extractor for extracting suspended solids or liquids from gas, comprising two members having adjacent surfaces, said members being relatively movable and pressed toward each other, one of said members being provided with an aperture from which each of the surfaces has a radial component and through which the gas to be purified may be supplied to the space between such surfaces, a pocket into which the outer edge of the space between such two surfaces discharges, and a discharge conduit leading from the outer edge of such space.

3. An extractor for extracting suspended solids or liquids from gas, comprising two members having adjacent surfaces, said members being relatively movable and pressed toward each other, one of said members being provided with an aperture from which each of the surfaces has a radial component and through which the gas to be purified may be supplied to the space between such surfaces.

4. An extractor for extracting suspended solids or liquids from gas, comprising two members having adjacent surfaces, said members being relatively movable, one of said members being provided with an aperture from which each of the surfaces has a radial component and through which the gas to be purified may be supplied to the space between such surfaces.

5. An extractor for extracting suspended solids or liquids from gas, comprising two members having adjacent surfaces substantially parallel with each other, one of said members being provided with an aperture from which each of the surfaces has a radial component and through which the gas to be purified may be supplied to the space between such surfaces.

6. An extractor for extracting suspended solids or liquids from gas, comprising two members having adjacent surfaces substantially parallel with each other, said members being relatively movable, one of said members being provided with an aperture from which each of the surfaces has a radial component and through which the gas to be purified may be supplied to the space between such surfaces.

7. An extractor for extracting suspended solids or liquids from gas, comprising two members having adjacent surfaces, one of said members being provided with an aperture from which each of the surfaces has a radial component and through which the gas to be purified may be supplied to the space between such surfaces.

8. An extractor for extracting suspended solids or liquids from gas, comprising two members having adjacent surfaces, one of said members being provided with an aperture from which each of the surfaces has a radial component and through which the gas to be purified may be supplied to the space between such surfaces, and a discharge conduit leading from the outer edge of such space.

9. An extractor for extracting suspended solids or liquids from gas, comprising two members having adjacent surfaces, one of said members being provided with an aperture from which each of the surfaces has a radial component and through which the gas to be purified may be supplied to the space between such surfaces, and a pocket into which the outer edge of the space between such two surfaces discharges.

10. An extractor for extracting suspended solids or liquids from gas, comprising two members having adjacent surfaces, one of said members being provided with an aperture from which each of the surfaces has a radial component and through which the gas to be purified may be supplied to the space between such surfaces, a pocket into which the outer edge of the space between such two surfaces discharges, and a discharge conduit leading from the outer edge of such space.

In witness whereof, I, have hereunto set my hand at Connersville, Indiana, this fifteenth day of May, A. D. one thousand nine hundred and fourteen.

JOHN T. WILKIN.

Witnesses:
J. T. SUTLIFF,
J. E. HUSTON.